(12) United States Patent
Penilla et al.

(10) Patent No.: US 9,579,987 B2
(45) Date of Patent: *Feb. 28, 2017

(54) METHODS FOR ELECTRIC VEHICLE (EV) CHARGE LOCATION VISUAL INDICATORS, NOTIFICATIONS OF CHARGE STATE AND CLOUD APPLICATIONS

(71) Applicants: Angel A. Penilla, Sacramento, CA (US); Albert S. Penilla, Sunnyvale, CA (US)

(72) Inventors: Angel A. Penilla, Sacramento, CA (US); Albert S. Penilla, Sunnyvale, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/880,970

(22) Filed: Oct. 12, 2015

(65) Prior Publication Data

US 2016/0031338 A1 Feb. 4, 2016

Related U.S. Application Data

(63) Continuation of application No. 13/797,974, filed on Mar. 12, 2013, now Pat. No. 9,180,783, and a
(Continued)

(51) Int. Cl.
*H02J 7/00* (2006.01)
*B60L 11/18* (2006.01)
(Continued)

(52) U.S. Cl.
CPC ........... *B60L 11/1842* (2013.01); *B60L 1/003* (2013.01); *B60L 1/06* (2013.01); *B60L 11/1805* (2013.01); *B60L 11/1816* (2013.01); *B60L 11/1822* (2013.01); *B60L 11/1824* (2013.01); *B60L 11/1846* (2013.01); *B60L 11/1848* (2013.01); *B60L 11/1862* (2013.01); *B60L 11/1864* (2013.01); *G01C 21/3469* (2013.01); *G06Q 10/20* (2013.01); *G06Q 20/18* (2013.01); *G06Q 30/00* (2013.01); *G06Q 30/0643* (2013.01); *G06Q 30/0645* (2013.01);
(Continued)

(58) Field of Classification Search
CPC ....................................................... G01C 21/00
USPC ............................................. 320/109; 701/22
See application file for complete search history.

(56) References Cited

U.S. PATENT DOCUMENTS 3,690,397 A 9/1972 Parker
3,799,063 A 3/1974 Reed
(Continued)

*Primary Examiner* — Drew A Dunn
*Assistant Examiner* — Zixuan Zhou

(57) ABSTRACT

Methods for managing charge status of an electric vehicle (EV) at a charge unit (CU) and systems that use cloud processing, are provided. One method includes detecting connection of a charging connector of the charge unit to a vehicle charge port of the EV. The method also includes receiving charge status of the EV while the charging connector is connected to the CU and activating a visual indicator at the CU. The visual indicator is set indicative of the charge status of the EV. The method includes changing the visual indicator as the charge status of the EV changes. The method enables a user device to receive notifications of charge status and communicate with cloud processing to request changing of the visual indicator of the CU to a non-full state even when the EV is at a full state of charging.

16 Claims, 7 Drawing Sheets

Related U.S. Application Data continuation-in-part of application No. 13/452,882, filed on Apr. 22, 2012, now Pat. No. 9,123,035.

(60) Provisional application No. 61/745,729, filed on Dec. 24, 2012, provisional application No. 61/478,436, filed on Apr. 22, 2011.

(51) Int. Cl.

| | | |
|---|---|---|
| G06Q 10/00 | (2012.01) | |
| G06Q 20/18 | (2012.01) | |
| G06Q 30/00 | (2012.01) | |
| G06Q 30/06 | (2012.01) | |
| G07F 15/00 | (2006.01) | |
| H04W 4/04 | (2009.01) | |
| H02J 5/00 | (2016.01) | |
| H04L 29/08 | (2006.01) | |
| H04W 68/00 | (2009.01) | |
| B60L 1/00 | (2006.01) | |
| B60L 1/06 | (2006.01) | |
| G01C 21/34 | (2006.01) | |
| G01C 21/36 | (2006.01) | |
| H04W 84/12 | (2009.01) | |

(52) U.S. Cl.
CPC .............. *G07F 15/005* (2013.01); *H02J 5/00* (2013.01); *H02J 7/0047* (2013.01); *H02J 7/0052* (2013.01); *H04L 67/125* (2013.01); *H04W 4/046* (2013.01); *H04W 68/00* (2013.01); *B60L 2230/16* (2013.01); *B60L 2240/12* (2013.01); *B60L 2240/34* (2013.01); *B60L 2240/547* (2013.01); *B60L 2240/622* (2013.01); *B60L 2240/72* (2013.01); *B60L 2240/80* (2013.01); *B60L 2250/10* (2013.01); *B60L 2250/12* (2013.01); *B60L 2250/16* (2013.01); *B60L 2250/20* (2013.01); *G01C 21/3679* (2013.01); *H02J 2007/005* (2013.01); *H02J 2007/0096* (2013.01); *H04W 84/12* (2013.01); *Y02E 60/721* (2013.01); *Y02T 10/7005* (2013.01); *Y02T 10/7044* (2013.01); *Y02T 10/7061* (2013.01); *Y02T 10/7088* (2013.01); *Y02T 10/7291* (2013.01); *Y02T 90/121* (2013.01); *Y02T 90/124* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/169* (2013.01); *Y04S 10/126* (2013.01); *Y04S 30/14* (2013.01); *Y04S 50/10* (2013.01); *Y04S 50/12* (2013.01)

(56) References Cited

U.S. PATENT DOCUMENTS

| | | |
|---|---|---|
| 3,867,682 A | 2/1975 | Ohya |
| 4,052,655 A | 10/1977 | Vizza |
| 4,102,273 A | 7/1978 | Merkle et al. |
| 4,132,174 A | 1/1979 | Ziegenfus et al. |
| 4,162,445 A | 7/1979 | Campbell |
| 4,309,644 A | 1/1982 | Reimers |
| 4,347,472 A | 8/1982 | Lemelson |
| 4,383,210 A | 5/1983 | Wilkinson |
| 4,389,608 A | 6/1983 | Dahl et al. |
| 4,405,891 A | 9/1983 | Galloway |
| 4,433,278 A | 2/1984 | Lowndes et al. |
| 4,450,400 A | 5/1984 | Gwyn |
| 4,532,418 A | 7/1985 | Meese |
| 4,789,047 A | 12/1988 | Knobloch |
| 4,815,840 A | 3/1989 | Benayad-Cherif et al. |
| 5,049,802 A | 9/1991 | Mintus et al. |
| 5,121,112 A | 6/1992 | Nakadozono |
| 5,132,666 A | 7/1992 | Fahs |
| 5,184,058 A | 2/1993 | Hesse |
| 5,202,617 A | 4/1993 | Nor |
| 5,297,664 A | 3/1994 | Tseng et al. |
| 5,306,999 A | 4/1994 | Hoffman |
| 5,315,227 A | 5/1994 | Pierson |
| 5,327,066 A | 7/1994 | Smith |
| 5,343,970 A | 9/1994 | Severinsky |
| 5,422,624 A | 6/1995 | Smith |
| 5,434,781 A | 7/1995 | Alofs |
| 5,441,122 A | 8/1995 | Yoshida |
| 5,449,995 A | 9/1995 | Kohchi |
| 5,487,002 A | 1/1996 | Diler et al. |
| 5,488,283 A | 1/1996 | Dougher et al. |
| 5,492,190 A | 2/1996 | Yoshida |
| 5,548,200 A | 8/1996 | Nor et al. |
| 5,549,443 A | 8/1996 | Hammerslag |
| 5,555,502 A | 9/1996 | Opel |
| 5,563,491 A | 10/1996 | Tseng |
| 5,585,205 A | 12/1996 | Kohchi |
| 5,594,318 A | 1/1997 | Knor |
| 5,595,271 A | 1/1997 | Tseng |
| 5,596,258 A | 1/1997 | Kimura et al. |
| 5,612,606 A | 3/1997 | Guimarin et al. |
| 5,627,752 A | 5/1997 | Buck et al. |
| 5,636,145 A | 6/1997 | Gorman et al. |
| 5,642,270 A | 6/1997 | Green et al. |
| 5,666,102 A | 9/1997 | Lahiff |
| 5,691,695 A | 11/1997 | Lahiff |
| 5,694,019 A | 12/1997 | Uchida et al. |
| 5,701,706 A | 12/1997 | Kreysler et al. |
| 5,736,833 A | 4/1998 | Farris |
| 5,760,569 A | 6/1998 | Chase, Jr. |
| 5,778,326 A | 7/1998 | Moroto et al. |
| 5,790,976 A | 8/1998 | Boll et al. |
| 5,892,598 A | 4/1999 | Asakawa et al. |
| 5,916,285 A | 6/1999 | Alofs et al. |
| 5,974,136 A | 10/1999 | Murai |
| 5,998,963 A | 12/1999 | Aarseth |
| 6,014,597 A | 1/2000 | Kochanneck |
| 6,049,745 A | 4/2000 | Douglas et al. |
| 6,067,008 A | 5/2000 | Smith |
| 6,081,205 A | 6/2000 | Williams |
| 6,085,131 A | 7/2000 | Kim |
| 6,151,539 A | 11/2000 | Bergholz et al. |
| 6,175,789 B1 | 1/2001 | Beckert et al. |
| 6,225,776 B1 | 5/2001 | Chai |
| 6,234,932 B1 | 5/2001 | Kuroda et al. |
| 6,236,333 B1 | 5/2001 | King |
| 6,252,380 B1 | 6/2001 | Koenck |
| 6,301,531 B1 | 10/2001 | Pierro |
| 6,307,349 B1 | 10/2001 | Koenck et al. |
| 6,330,497 B1 | 12/2001 | Obradovich et al. |
| 6,330,499 B1 | 12/2001 | Chou et al. |
| 6,370,475 B1 | 4/2002 | Breed et al. |
| 6,373,380 B1 | 4/2002 | Robertson et al. |
| 6,416,209 B1 | 7/2002 | Abbott |
| 6,434,465 B2 | 8/2002 | Schmitt et al. |
| 6,456,041 B1 | 9/2002 | Terada et al. |
| 6,466,658 B2 | 10/2002 | Schelberg, Jr. et al. |
| 6,480,767 B2 | 11/2002 | Yamaguchi |
| 6,487,477 B1 | 11/2002 | Woestmanm et al. |
| 6,498,454 B1 | 12/2002 | Pinlam |
| 6,511,192 B1 | 1/2003 | Henion |
| 6,586,866 B1 | 7/2003 | Ikedo |
| 6,614,204 B2 | 9/2003 | Pellegrino et al. |
| 6,629,024 B2 | 9/2003 | Tabata |
| 6,727,809 B1 | 4/2004 | Smith |
| 6,741,036 B1 | 5/2004 | Ikedo |
| 6,765,495 B1 | 7/2004 | Dunning et al. |
| 6,789,733 B2 | 9/2004 | Terranova |
| 6,794,849 B2 | 9/2004 | Mori et al. |
| 6,850,898 B1 | 2/2005 | Murakami |
| 6,915,869 B2 | 7/2005 | Botti |
| 6,922,629 B2 | 7/2005 | Yoshikawa et al. |
| 6,937,140 B1 | 8/2005 | Outslay |
| 6,940,254 B2 | 9/2005 | Nagamine |
| 7,013,205 B1 | 3/2006 | Hafner |

(56) References Cited

U.S. PATENT DOCUMENTS

| | | |
|---|---|---|
| 7,039,389 B2 | 5/2006 | Johnson, Jr. |
| 7,084,781 B2 | 8/2006 | Chuey |
| 7,201,384 B2 | 4/2007 | Chaney |
| 7,269,416 B2 | 9/2007 | Guthrie et al. |
| 7,289,611 B2 | 10/2007 | Iggulden |
| 7,376,497 B2 | 5/2008 | Chen |
| 7,379,541 B2 | 5/2008 | Iggulden et al. |
| 7,402,978 B2 | 7/2008 | Pryor |
| 7,532,965 B2 | 5/2009 | Robillard |
| 7,565,396 B2 | 7/2009 | Hoshina |
| 7,630,802 B2 | 12/2009 | Breed |
| 7,650,210 B2 | 1/2010 | Breed |
| 7,674,536 B2 | 3/2010 | Chipchase |
| 7,683,771 B1 | 3/2010 | Loeb |
| 7,693,609 B2 | 4/2010 | Kressner et al. |
| 7,698,078 B2 | 4/2010 | Kelty et al. |
| 7,740,092 B2 | 6/2010 | Bender |
| 7,751,945 B2 | 7/2010 | Obata |
| 7,778,746 B2 | 8/2010 | McLeod |
| 7,796,052 B2 | 9/2010 | Katz |
| 7,850,351 B2 | 12/2010 | Pastrick et al. |
| 7,869,576 B1 | 1/2011 | Rodkey et al. |
| 7,885,893 B2 | 2/2011 | Alexander |
| 7,949,435 B2 | 5/2011 | Pollack |
| 7,956,570 B2 | 6/2011 | Lowenthal |
| 7,979,198 B1 | 7/2011 | Kim et al. |
| 7,986,126 B1 | 7/2011 | Bucci |
| 7,991,665 B2 | 8/2011 | Hafner |
| 8,006,793 B2 | 8/2011 | Heichal et al. |
| 8,027,843 B2 | 9/2011 | Bodin et al. |
| 8,036,788 B2 | 10/2011 | Breed |
| 8,054,048 B2 | 11/2011 | Woody |
| 8,072,318 B2 | 12/2011 | Lynam |
| 8,103,391 B2 | 1/2012 | Ferro et al. |
| 8,256,553 B2 | 9/2012 | De Paschoal |
| 8,262,268 B2 | 9/2012 | Pastrick et al. |
| 8,265,816 B1 | 9/2012 | LaFrance |
| 8,266,075 B2 | 9/2012 | Ambrosio et al. |
| 8,294,420 B2 | 10/2012 | Kocher |
| 8,333,492 B2 | 12/2012 | Dingman et al. |
| 8,336,664 B2 | 12/2012 | Wallace et al. |
| 8,350,526 B2 | 1/2013 | Dyer et al. |
| 8,366,371 B2 | 2/2013 | Maniscalco et al. |
| 8,392,065 B2 | 3/2013 | Tolstedt |
| 8,405,347 B2 | 3/2013 | Gale |
| 8,482,255 B2 | 7/2013 | Crombez |
| 8,483,775 B2 | 7/2013 | Buck et al. |
| 8,483,907 B2 | 7/2013 | Tarte |
| 8,490,005 B2 | 7/2013 | Tarte |
| 8,508,188 B2 | 8/2013 | Murtha et al. |
| 8,521,599 B2 | 8/2013 | Rivers, Jr. et al. |
| 8,527,135 B2 | 9/2013 | Lowrey et al. |
| 8,527,146 B1 | 9/2013 | Jackson |
| 8,552,686 B2 | 10/2013 | Jung |
| 8,589,019 B2 | 11/2013 | Wallace et al. |
| 8,624,719 B2 | 1/2014 | Klose |
| 8,630,741 B1 | 1/2014 | Matsuoka et al. |
| 8,635,091 B2 | 1/2014 | Amigo |
| 8,643,329 B2 | 2/2014 | Prosser et al. |
| 8,660,734 B2 | 2/2014 | Zhu et al. |
| 8,686,864 B2 | 4/2014 | Hannon |
| 8,694,328 B1 | 4/2014 | Gormley |
| 8,706,394 B2 | 4/2014 | Trepagnier et al. |
| 8,713,121 B1 | 4/2014 | Bain |
| 8,717,170 B1 | 5/2014 | Juhasz |
| 8,725,551 B2 | 5/2014 | Ambrosio et al. |
| 8,751,065 B1 | 6/2014 | Kato |
| 8,751,271 B2 | 6/2014 | Stefik et al. |
| 8,760,432 B2 | 6/2014 | Jira et al. |
| 8,799,037 B2 | 8/2014 | Stefik et al. |
| 8,816,845 B2 | 8/2014 | Hoover et al. |
| 8,818,622 B2 | 8/2014 | Bergholz et al. |
| 8,818,725 B2 | 8/2014 | Ricci |
| 8,819,414 B2 | 8/2014 | Bellur et al. |
| 8,825,222 B2 | 9/2014 | Namburu et al. |
| 8,836,281 B2 | 9/2014 | Ambrosio et al. |
| 2002/0064258 A1 | 5/2002 | Schelberg et al. |
| 2002/0085043 A1 | 7/2002 | Ribak |
| 2002/0133273 A1 | 9/2002 | Lowrey et al. |
| 2003/0137277 A1 | 7/2003 | Mori et al. |
| 2003/0153278 A1 | 8/2003 | Johnson |
| 2003/0205619 A1 | 11/2003 | Terranova et al. |
| 2003/0234325 A1 | 12/2003 | Marino et al. |
| 2004/0046506 A1 | 3/2004 | Mawai et al. |
| 2004/0064235 A1 | 4/2004 | Cole |
| 2004/0092253 A1 | 5/2004 | Simonds et al. |
| 2004/0093155 A1 | 5/2004 | Simonds et al. |
| 2004/0265671 A1 | 12/2004 | Chipchase et al. |
| 2005/0021190 A1 | 1/2005 | Worrell et al. |
| 2005/0044245 A1 | 2/2005 | Hoshina |
| 2005/0231119 A1 | 10/2005 | Ito et al. |
| 2006/0125620 A1 | 6/2006 | Smith et al. |
| 2006/0182241 A1 | 8/2006 | Schelberg |
| 2006/0282381 A1 | 12/2006 | Ritchie |
| 2006/0287783 A1 | 12/2006 | Walker |
| 2007/0068714 A1 | 3/2007 | Bender |
| 2007/0126395 A1 | 6/2007 | Suchar |
| 2007/0282495 A1 | 12/2007 | Kempton |
| 2008/0039979 A1 | 2/2008 | Bridges et al. |
| 2008/0039989 A1 | 2/2008 | Pollack et al. |
| 2008/0040129 A1 | 2/2008 | Cauwels et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olsen et al. |
| 2008/0097904 A1 | 4/2008 | Volchek |
| 2008/0155008 A1 | 6/2008 | Stiles et al. |
| 2008/0180027 A1 | 7/2008 | Matsushita et al. |
| 2008/0203973 A1 | 8/2008 | Gale et al. |
| 2008/0228613 A1 | 9/2008 | Alexander |
| 2008/0281663 A1 | 11/2008 | Hakim |
| 2008/0294283 A1 | 11/2008 | Ligrano |
| 2008/0312782 A1 | 12/2008 | Berdichevsky |
| 2009/0011639 A1 | 1/2009 | Ballard et al. |
| 2009/0021213 A1 | 1/2009 | Johnson |
| 2009/0021385 A1 | 1/2009 | Kelty et al. |
| 2009/0030712 A1 | 1/2009 | Bogolea |
| 2009/0043519 A1 | 2/2009 | Bridges et al. |
| 2009/0058355 A1 | 3/2009 | Meyer |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean |
| 2009/0144001 A1 | 6/2009 | Leonard et al. |
| 2009/0157289 A1 | 6/2009 | Graessley |
| 2009/0164473 A1 | 6/2009 | Bauer |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0013434 A1 | 1/2010 | Taylor-Haw et al. |
| 2010/0017045 A1 | 1/2010 | Nesler et al. |
| 2010/0017249 A1 | 1/2010 | Fincham et al. |
| 2010/0042519 A1 | 2/2010 | Dingler et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0057306 A1 | 3/2010 | Ishii et al. |
| 2010/0112843 A1 | 5/2010 | Heichai et al. |
| 2010/0141206 A1 | 6/2010 | Agassi et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0198508 A1 | 8/2010 | Tang |

(56) References Cited

U.S. PATENT DOCUMENTS

| | | |
|---|---|---|
| 2010/0198513 A1 | 8/2010 | Zeng |
| 2010/0211340 A1 | 8/2010 | Lowenthal et al. |
| 2010/0211643 A1 | 8/2010 | Lowenthal et al. |
| 2010/0222939 A1 | 9/2010 | Namburu |
| 2010/0268426 A1 | 10/2010 | Pathak |
| 2010/0280956 A1 | 11/2010 | Chutorash et al. |
| 2010/0304349 A1 | 12/2010 | Kunin |
| 2011/0032110 A1 | 2/2011 | Taguchi |
| 2011/0057612 A1 | 3/2011 | Taguchi et al. |
| 2011/0074350 A1 | 3/2011 | Kocher |
| 2011/0074351 A1 | 3/2011 | Bianco et al. |
| 2011/0077809 A1 | 3/2011 | Leary |
| 2011/0106329 A1 | 5/2011 | Donnelly et al. |
| 2011/0112969 A1 | 5/2011 | Zaid et al. |
| 2011/0130885 A1 | 6/2011 | Bowen et al. |
| 2011/0175569 A1* | 7/2011 | Austin ............... B60L 11/1824 320/109 |
| 2011/0187521 A1 | 8/2011 | Beruscha et al. |
| 2011/0191186 A1 | 8/2011 | Levy et al. |
| 2011/0191265 A1 | 8/2011 | Lowenthal et al. |
| 2011/0193522 A1 | 8/2011 | Uesugi |
| 2011/0202218 A1 | 8/2011 | Yano |
| 2011/0246252 A1 | 10/2011 | Uesugi |
| 2011/0279083 A1 | 11/2011 | Asai |
| 2011/0309929 A1 | 12/2011 | Myers |
| 2012/0013300 A1 | 1/2012 | Prosser et al. |
| 2012/0019204 A1 | 1/2012 | Matsuo |
| 2012/0025765 A1* | 2/2012 | Frey ..................... B60L 3/0069 320/109 |
| 2012/0028680 A1 | 2/2012 | Breed |
| 2012/0041624 A1 | 2/2012 | Stewart et al. |
| 2012/0053754 A1 | 3/2012 | Pease |
| 2012/0074903 A1 | 3/2012 | nakashima |
| 2012/0105197 A1 | 5/2012 | Kobres |
| 2012/0123670 A1 | 5/2012 | Uyeki |
| 2012/0136743 A1 | 5/2012 | McQuade et al. |
| 2012/0136802 A1 | 5/2012 | McQuade et al. |
| 2012/0158244 A1 | 6/2012 | Talty et al. |
| 2012/0179323 A1 | 7/2012 | Profitt-Brown et al. |
| 2012/0218128 A1 | 8/2012 | Tieman et al. |
| 2012/0229056 A1 | 9/2012 | Bergfjord |
| 2012/0229085 A1 | 9/2012 | Lau |
| 2012/0232965 A1 | 9/2012 | Rodriguez et al. |
| 2012/0233077 A1 | 9/2012 | Tate et al. |
| 2012/0262002 A1 | 10/2012 | Widmer et al. |
| 2012/0268068 A1 | 10/2012 | Jung et al. |
| 2012/0268076 A1 | 10/2012 | Danner |
| 2012/0268242 A1 | 10/2012 | Tieman et al. |
| 2012/0280654 A1 | 11/2012 | Kim |
| 2012/0296512 A1 | 11/2012 | Lee et al. |
| 2012/0303397 A1 | 11/2012 | Prosser |
| 2012/0306445 A1 | 12/2012 | Park et al. |
| 2012/0310713 A1 | 12/2012 | Mercuri et al. |
| 2012/0316671 A1 | 12/2012 | Hammerslag et al. |
| 2013/0002876 A1 | 1/2013 | Pastrick et al. |
| 2013/0020139 A1 | 1/2013 | Kim et al. |
| 2013/0021162 A1 | 1/2013 | DeBoer et al. |
| 2013/0037339 A1 | 2/2013 | Hickox |
| 2013/0099892 A1 | 4/2013 | Trucker et al. |
| 2013/0103236 A1 | 4/2013 | Mehrgan |
| 2013/0110296 A1 | 5/2013 | Khoo et al. |
| 2013/0110632 A1 | 5/2013 | Theurer et al. |
| 2013/0110653 A1 | 5/2013 | Rivers et al. |
| 2013/0127247 A1 | 5/2013 | Oh et al. |
| 2013/0135093 A1 | 5/2013 | Araki |
| 2013/0144520 A1 | 6/2013 | Ricci |
| 2013/0145065 A1 | 6/2013 | Ricci |
| 2013/0179057 A1 | 7/2013 | Fisher et al. |
| 2013/0204466 A1 | 8/2013 | Ricci |
| 2013/0241720 A1 | 9/2013 | Ricci et al. |
| 2013/0253746 A1 | 9/2013 | Choi et al. |
| 2013/0280018 A1 | 10/2013 | Meirer et al. |
| 2013/0300554 A1 | 11/2013 | Braden |
| 2013/0317693 A1 | 11/2013 | Jefferies et al. |
| 2013/0317694 A1 | 11/2013 | Merg et al. |
| 2013/0328387 A1 | 12/2013 | Venkateswaran |
| 2013/0338820 A1 | 12/2013 | Corbett et al. |
| 2013/0342363 A1 | 12/2013 | Paek et al. |
| 2014/0002015 A1 | 1/2014 | Tripathi et al. |
| 2014/0019280 A1 | 1/2014 | Medeiros et al. |
| 2014/0021908 A1 | 1/2014 | McCool |
| 2014/0042968 A1 | 2/2014 | hiroe |
| 2014/0047107 A1 | 2/2014 | Maturana et al. |
| 2014/0066049 A1 | 3/2014 | Cho et al. |
| 2014/0089016 A1 | 3/2014 | Smullin et al. |
| 2014/0106726 A1 | 4/2014 | Crosbie |
| 2014/0118107 A1 | 5/2014 | Almomani |
| 2014/0120829 A1 | 5/2014 | Bhamidipati et al. |
| 2014/0125355 A1 | 5/2014 | Grant |
| 2014/0142783 A1 | 5/2014 | Grimm et al. |
| 2014/0163771 A1 | 6/2014 | Demeniuk |
| 2014/0163774 A1 | 6/2014 | Demeniuk |
| 2014/0164559 A1 | 6/2014 | Demeniuk |
| 2014/0172192 A1 | 6/2014 | Kato |
| 2014/0172265 A1 | 6/2014 | Funabashi |
| 2014/0172727 A1 | 6/2014 | Abhyanker et al. |
| 2014/0179353 A1 | 6/2014 | Simon |
| 2014/0200742 A1 | 7/2014 | Mauti et al. |
| 2014/0203077 A1 | 7/2014 | Gadh et al. |
| 2014/0207333 A1 | 7/2014 | Vandivier et al. |
| 2014/0214261 A1 | 7/2014 | Ramamoorthy et al. |
| 2014/0214321 A1 | 7/2014 | Kawamata et al. |
| 2014/0218189 A1 | 8/2014 | Fleming et al. |
| 2014/0232331 A1 | 8/2014 | Stamenic et al. |
| 2014/0236414 A1 | 8/2014 | Droz et al. |
| 2014/0236463 A1 | 8/2014 | Zhang et al. |
| 2014/0253018 A1 | 9/2014 | Kong et al. |
| 2014/0277936 A1 | 9/2014 | El Dokor et al. |
| 2014/0278089 A1 | 9/2014 | Gusikhin et al. |
| 2014/0300739 A1 | 10/2014 | Mimar |

* cited by examiner

METHODS FOR ELECTRIC VEHICLE (EV) CHARGE LOCATION VISUAL INDICATORS, NOTIFICATIONS OF CHARGE STATE AND CLOUD APPLICATIONS

CLAIM OF PRIORITY

The present application is continuation application of U.S. patent application Ser. No. 13/797,974, entitled "METHODS AND SYSTEMS FOR ELECTRIC VEHICLE (EV) CHARGE LOCATION COLOR-CODED CHARGE STATE INDICATORS, CLOUD APPLICATIONS AND USER NOTIFICATIONS", filed on Mar. 12, 2013, which claims priority to U.S. Provisional Patent Application No. 61/745,729, filed on Dec. 24, 2012, and entitled "METHODS AND SYSTEMS FOR ELECTRIC VEHICLE (EV) CHARGING, CHARGING SYSTEMS, INTERNET APPLICATIONS AND USER NOTIFICATIONS", which are herein incorporated by reference.

U.S. patent application Ser. No. 13/797,974, entitled "METHODS AND SYSTEMS FOR ELECTRIC VEHICLE (EV) CHARGE LOCATION COLOR-CODED CHARGE STATE INDICATORS, CLOUD APPLICATIONS AND USER NOTIFICATIONS", filed on Mar. 12, 2013 is also a continuation-in-part of U.S. application Ser. No. 13/452,882, filed Apr. 22, 2012, (now issued as U.S. Pat. No. 9,123,035, on Sep. 1, 2015) and entitled "ELECTRIC VEHICLE (EV) RANGE EXTENDING CHARGE SYSTEMS, DISTRIBUTED NETWORKS OF CHARGE KIOSKS, AND CHARGE LOCATING MOBILE APPS", which claims priority to U.S. Provisional Application No. 61/478,436, filed on Apr. 22, 2011, which are incorporated herein by reference.

FIELD OF THE EMBODIMENTS

The present invention relates to systems and methods that enable operators of electric vehicles (EV) to obtain charge and information regarding charge availability.

BACKGROUND

Electric vehicles have been utilized for transportation purposes and recreational purposes for quite some time. Electric vehicles require a battery that powers an electric motor, and in turn propels the vehicle in the desired location. The drawback with electric vehicles is that the range provided by batteries is limited, and the infrastructure available to users of electric vehicles is substantially reduced compared to fossil fuel vehicles. For instance, fossil fuel vehicles that utilize gasoline and diesel to operate piston driven motors represent a majority of all vehicles utilized by people around the world. Consequently, fueling stations are commonplace and well distributed throughout areas of transportation, providing for easy refueling at any time. For this reason, fossil fuel vehicles are generally considered to have unlimited range, provided users refuel before their vehicles reach empty.

On the other hand, owners of electric vehicles must carefully plan their driving routes and trips around available recharging stations. For this reason, many electric vehicles on the road today are partially electric and partially fossil fuel burning. For those vehicles that are pure electric, owners usually rely on charging stations at their private residences, or specialty recharging stations. However specialty recharging stations are significantly few compared to fossil fuel stations. In fact, the scarcity of recharging stations in and around populated areas has caused owners of electric vehicles to coin the phrase "range anxiety," to connote the possibility that their driving trips may be limited in range, or that the driver of the electric vehicle will be stranded without recharging options. It is this problem of range anxiety that prevents more than electric car enthusiasts from switching to pure electric cars, and abandoning their expensive fossil fuel powered vehicles.

It is in this context that embodiments of the invention arise.

SUMMARY

In one embodiment, methods, systems, charge units, computer readable media, and combinations thereof are provided, to enable color coding of charging units (CUs), to provide a visual indication to users of when a CU is available, unavailable, in progress, out of service, etc.

In one embodiment, a method includes detecting connection of a charging connector of the charge unit to a vehicle charge port of the EV. The method includes receiving charge status of the EV while the charging connector is connected to the CU and activating a visual indicator at the CU. The visual indicator is set indicative of the charge status of the EV. The method includes changing the visual indicator as the charge status of the EV changes. The method enables a user device to receive notifications of charge status and communicate with cloud processing to request changing of the visual indicator of the CU to a non-full state even when the EV is at a full state of charging.

In one embodiment, a method for managing charge status of an electric vehicle (EV) at a charge unit (CU) is provided. The method includes detecting connection of a charging connector of the charge unit to a vehicle charge port of the EV. The method also includes receiving charge status of the EV while the charging connector is connected to the CU and activating a light at the CU. The light is set to a color that is indicative of the charge status of the EV. The method then includes changing the color of the light as the charge status of the EV changes. The method executed by a processor at a charge unit or on cloud processing logic over the Internet, or combinations thereof.

In one embodiment, detecting connection includes establishing initiation of data exchange between the EV and CU, the exchange of data can be through a data line in the charging connector or a wireless link between the EV and CU.

In one embodiment, the charge status includes determining a level of charge of a battery of the EV.

In one embodiment, the light at the CU is either connected to the CU or is proximate to the CU, and the color is set by a color shade on a light, a light emitting diode (LED) with a color shared that moves to different colors, a colored LED, or a plurality of colored LEDs that turn on a different times depending on the desired color for the charge status.

In one embodiment, a color is assigned to levels of charge of the vehicle, including a color to indicate a full level of charge of the EV, and wherein, a notification is generated and sent to a user account that was used to obtained charge for the EV at the CU.

In one embodiment, the notification is sent for one of a progress of charge, or to indicate that the EV has reached the full level of charge.

In one embodiment, the method also includes enabling a user account that was used to obtained charge for the EV at the CU to pay a fee, from a remote device, to change the color of the CU to a non-full state even when the EV is at the full level.

In one embodiment, the method also includes enabling sending a notification to a user account that was used to obtained charge for the EV at the CU, the notification providing a status of charge of the EV.

In one embodiment, the status of charge of the EV is published to a user account that is accessible over the Internet using a device having access to the Internet.

In one embodiment the color is illustrated on a graphical user interface on a display, when the user account is accessed to view the status of charge of the EV.

In one embodiment the CU includes a push notification function to enable users proximate to the CU to send a notification to the user account requesting that the EV be moved when the color indicates that the EV has reached a full state of charge and is not moved from a spot that is occupying the CU.

In one embodiment, the method also includes receiving a request from a local EV to locate a CU, and an available CU is activated to blink the color to enable visual identification from an area proximate to the CU.

In one embodiment, the method is executed by a CU having electronics, communication links to the Internet to access cloud processing logic, or can be executed partially by cloud processing logic and logic of the CU, or also process can be made or assisted by processing logic of electronics of the EV connected to the CU, or combinations thereof. Computer readable media can also be provided, which will hold processing instructions for carrying out any one of the method operations, as instructions, or by circuit or chips that are programmed to execute instructions or chips or circuits that communicate with a network, such as the internet.

DETAILED EMBODIMENTS

Figure 1:
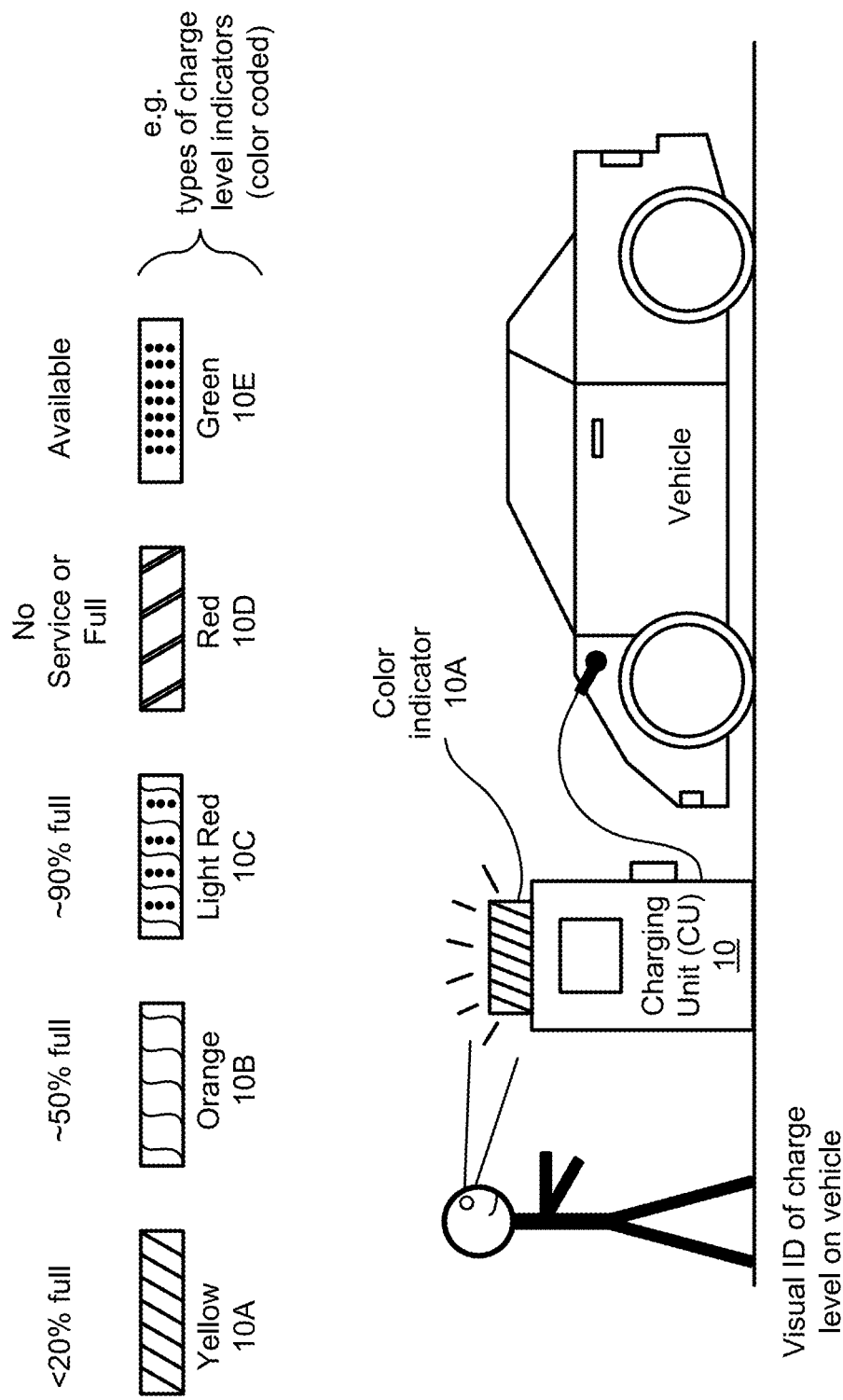
FIG. 1 illustrates a charge unit having a color indicator, which projects the charge state of an electric vehicle (EV) connected to the CU, in accordance with one embodiment.

In one embodiment, method are provided to enable color coding of charging units (CUs), to provide a visual indication to users of when a CU is available, unavailable, in progress, out of service, etc. The visual indicators, in one embodiment are color coded. The color coding can, in one embodiment, be visible to drivers or users in proximity to the CU. In other embodiments, the color indicators can also be published to the internet to allow remote users to quickly identify proximate CUs and identify their current use state. In other embodiments, users, via applications (on mobile devices or on the vehicle) can identify proximate CUs, their status, make reservations for particular CUs, and receive notifications of the progress. In one embodiment, be making reservations head of arriving at a CU, the user is best assured of having access to connect the EV to the CU, so that the charging process can be optimized.

A number of embodiments are described below, with reference to specific inventive topics and/or sub-embodiments that relate to electric vehicles, charging methods, wireless device synchronization to exchange information regarding charging events, cloud based processing technologies to share charge availability information, discounts across a charge supply grid, geo-location mapping and charge finding, user interfaces, charge unit identification systems, user interfaces to unify acquisition of charge, reservation of charge, charge units with color indicators to signal charge status and availability, charge supply systems and infrastructure for connecting charge to electric vehicles (EVs), cloud based databases and distributed data centers for tracking charge usage and sharing charge usage with charge providers, utilities, drivers of EVs, owners of charge units (CUs) and owners or managers of charge unit install points (CUIPs).

In one implementation, the listed embodiments may be viewed broadly to define separate defined embodiments. In other implementation, the listed embodiments may be combined with one or more of the respectively listed embodiments to define unified embodiments.

Payment for charge can, in one embodiment, be unified by a process or application that shares charge activity and provides revenue back to the suppliers of the CU. Payment can further be unified by enabling wireless payment at a CU. In one example, when an EV reaches a location of a CU, an application can be surfaced to the electronics of the vehicle or to a user's portable device. The application can provide the user with options to login or simply accept to proceed with automatic payment for charge consumed at the CU. Cloud services, which may run one or more applications, can maintain logs for the user to show historical charge activities and costs.

On the CU side, the supplier of the charge can also receive payment from the EV drivers and can be provided with metrics of charge utilization of one or more CUs in a network of CUs owned or operated by the CU supplier.

Utility companies or power suppliers can also be provided with metrics of charge use at various CUs, historical charge loads, and times of peak and lows for the various geographically distributed CUs. Utilities can therefore manage power supplies and power rates more effectively and can further populate real time cost per charge rates to EV users, which may discourage EV users from seeking charge during peak or more expensive times of day.

In one embodiment, methods and systems are provided, which include charge units (CUs), which include a color indicator on the charge unit (or station) or next to the charge unit. The color indicator, in one embodiment, is visible so that people in the parking lot or vicinity of charging can identify if cars that are connected to a charge station are already charged (or status of charging) and simply taking up space. The charge color indicator can be any color and can be provided with letters or signs to also communicate information, such as CU available, CU busy, CU out of service, CU in progress. The information can also be for information about the EV charging state, such as empty, 10% charged, 20% charged, 30% charged 70% charged, 100% charged, etc. If a color is used, example colors can be yellow 10A (see FIG. 1) to indicate less than 20% full, orange 10B to communicate ~50% full, light red 10C to communicate ~90% full, red 10D to communicate 100% full (or no service available).

The lights can be activated by a method or circuit to turn on or off, blink, pulse, trigger, or control operation. The lighting can be incandescent lighting, lighting with color coded shields, light emitting diodes (LEDs), colored LEDs, and the color can change from one color to another as the charging of an EV progresses (e.g., from yellow to RED, when full). When users drive up to an area or a parking lot with charge stations (or location of charge), EVs connected to the stations publicly show their fill state. If an EV is full, for example, it will be evident that the EV is simply taking up a space.

If the car (e.g., EV) is taking up space and the owner of the EV walked away, a color code at the charge station can be activated. In one embodiment, when an EV is connected to a CU, the user can be provided a code for the CU. The code can be, for example, a QR code, a number, a key, a bar code, etc. In addition to the code being used by the user of the EV, this code can also be used by any person to cause cloud services to send a ping or notification to the user/owner of the car.

For instance, if the user has left temporarily to shop while the car charges, the user may return quickly upon being notified that the charging is complete or is about to complete. As noted, this notification may be in addition to an automatic notification of charge state or completion. That is, an additional notification may be sent by frustrated users that may want to park in the spot that is taken up by the car. To avoid abuse, the notification may be limited to a set number of notifications.

In one embodiment, the charge stations may have an ID (like a QR Code, number, text ID, etc.) that the user can use to sync to when plugging in the car. The ID can be used to notify the user when the charge level reaches full or progresses to charge. If the user does not come back to move the car, the user can pay a fee to stay in the spot to avoid citation. In one embodiment, by paying a fee (e.g., remotely by a mobile device), the color indicator on the charge spot can be kept at a color that is other than full. This will signal to others in the area that the user taking up the spot is legitimately taking up the spot.

In one embodiment, the user may be parked/plugged in at a charge unit (CU) located at or proximate to a store (the CU at that location is registered as a charge unit install point (CUIP)). In this embodiment, the store (e.g., a target) can give the user a discount on the charge or space time if they buy X in the store, etc. This method allows for proximate retailers to sponsor EV drivers to park proximate to the retailers. This sponsorship or promotion can be published to cloud services, which allows EV users to know when such promotions are available. If the user of the EV is looking for charge, and the user also needs particular services, and publishing discounts or promotions will allow EV drivers to select certain CUs over other CUs.

In another embodiment, the user may be at work and plugged in to the employer's charge spot. If the user leaves the car plugged in past the time it needs to fill and charge the battery of the electric vehicle (EV), that user may be taking up space that could be used by other co-workers. In one embodiment, when the user plugs into the CU, the user can capture the ID of the CU and register to that charge session. In this manner, the user can be provided notifications as the charge level progresses. The notifications can be by application icons, buzzing, sounds, texts, phone calls, instant messaging, etc. At the time the CU is connected to the user's EV, the user can define how notifications will be sent to the user. The color indicator of the CU can also change as the EV progresses to charged. The same color indicators can be transferred to the owner of the EV as the colors progress to the various colors of charge. In one embodiment, notifications allow users to move their vehicles timely, to allow others to use the CU. In addition, the color indicators provide a way to locally alert people driving EVs if the CUs are actually being used fairly in a particular location, whether private or pubic.

Figure 2:
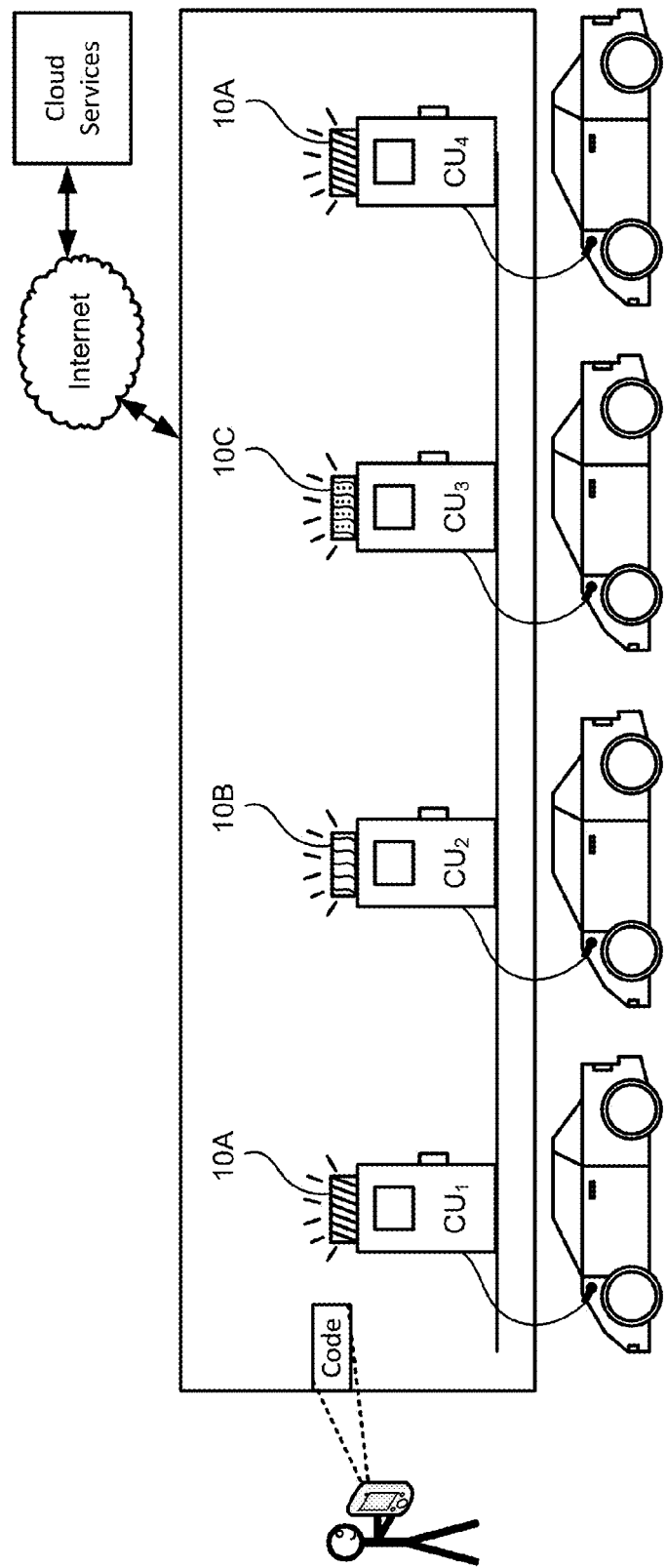
FIG. 2 illustrates an example of a charge bank of CUs, and various color indicators, and codes for notifying users of charge state, in accordance with one embodiment.
Figure 3:
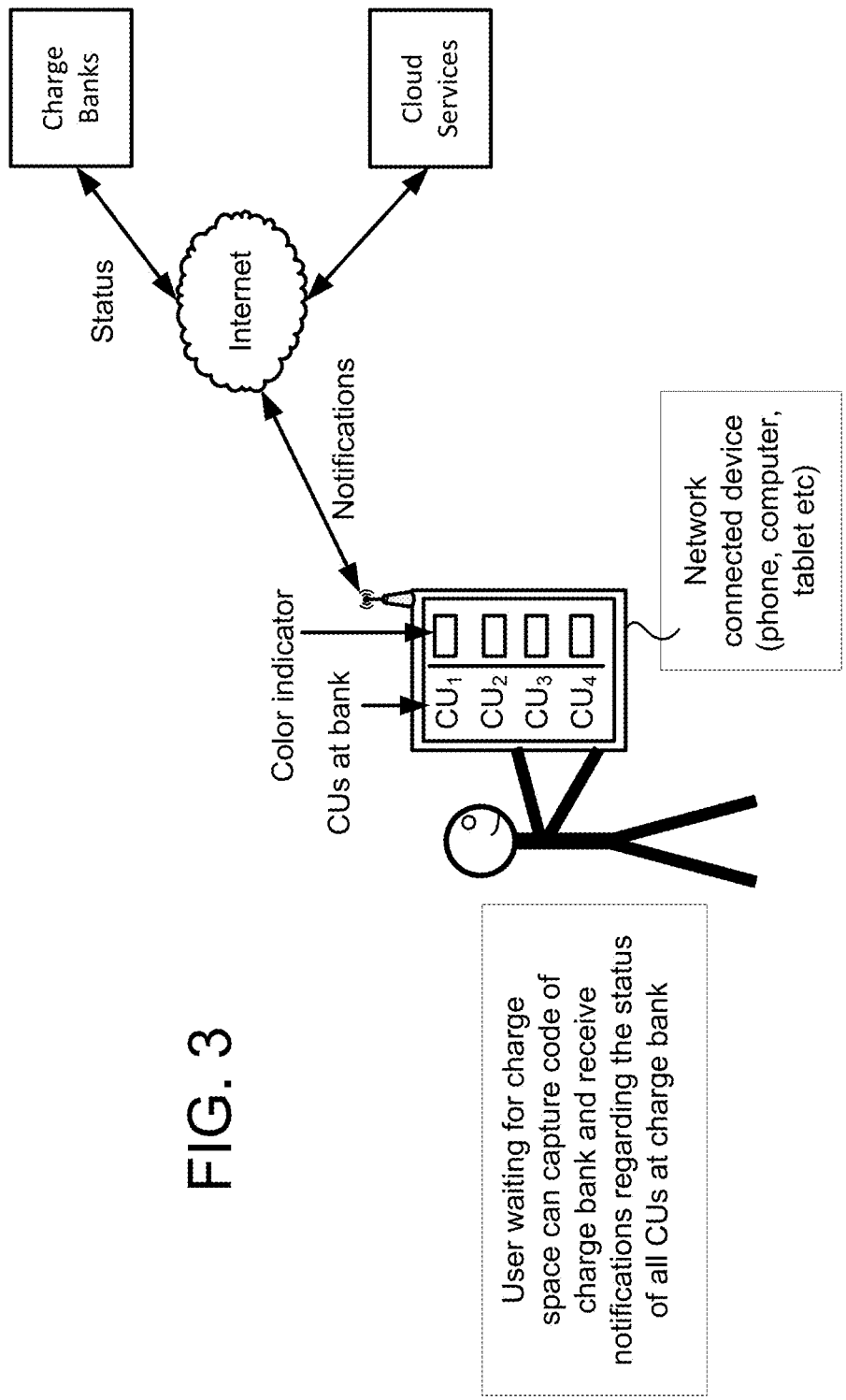
FIG. 3 illustrates an example of a user mobile device, and notifications that can be provided, along with color indicators, in accordance with one embodiment.

FIG. 1 shows how one user can identify the color state of a CU while the EV progresses to a charge state. In FIG. 2, a charge bank A, can be a location where more than one CU is arranged for charging EVs. If a user drives up to a charge bank A and sees that all slots are taken and the color indicators on the CUs show in-progress charging, the user can capture or input a code of the charge bank A. The code can be used to communicate progress information back to the user while the user waits for a charging spot to open up. Instead of having to be physically present to see the charge state of the CUs in charge bank A, the user can login to cloud services to find charge bank A. As shown in FIG. 3, from a remote location, therefore, a user can see the CUs that are located at the charge bank A, and also see the color indicators of each CU. This can be used ahead of time by the driver of the EV to determine whether he/she wishes to go to charge bank A for charge. For instance, if it looks like spots are available now or the vehicles are nearly all full, the user can opt to drive to the EV to obtain charge from charge bank A.

Cloud services can also provide an approximation of when a CU will be available at bank A, or any other location. Still further, an EV driver can be provided with a list of CUs in the geo-location of the vehicle, based on which CUs will be available.

Notifications regarding charge bank A or other charge banks, can be provided to the user as the charge levels change for the CUs. This provides a dynamic level of information that can be communicated to users regarding current state and projected states of charge. For example, probability and other logic can be used to estimate availability of charge at particular CUIPs along the users projected path of driving or based on the users heading. This information can be provided to the driver so he/she can select where to attempt to get charge and wait the least amount of time. Users can also remotely reserve an EV, so that the EV is available when the driver arrives.

This information can also be blended with cost of charge, in case the user is looking for a lower charge alternative. The notifications can be sent to the user's mobile device (e.g., smartphone or the like), or the vehicle electronics of the vehicle and associated displays and GUIs. The notifications can be sent with color codes or indicators, that show the level of charge of the CUs for which the user is interested. The color notifications can, in real time, be updated as the charge level status changes at the CUs.

Figure 4:
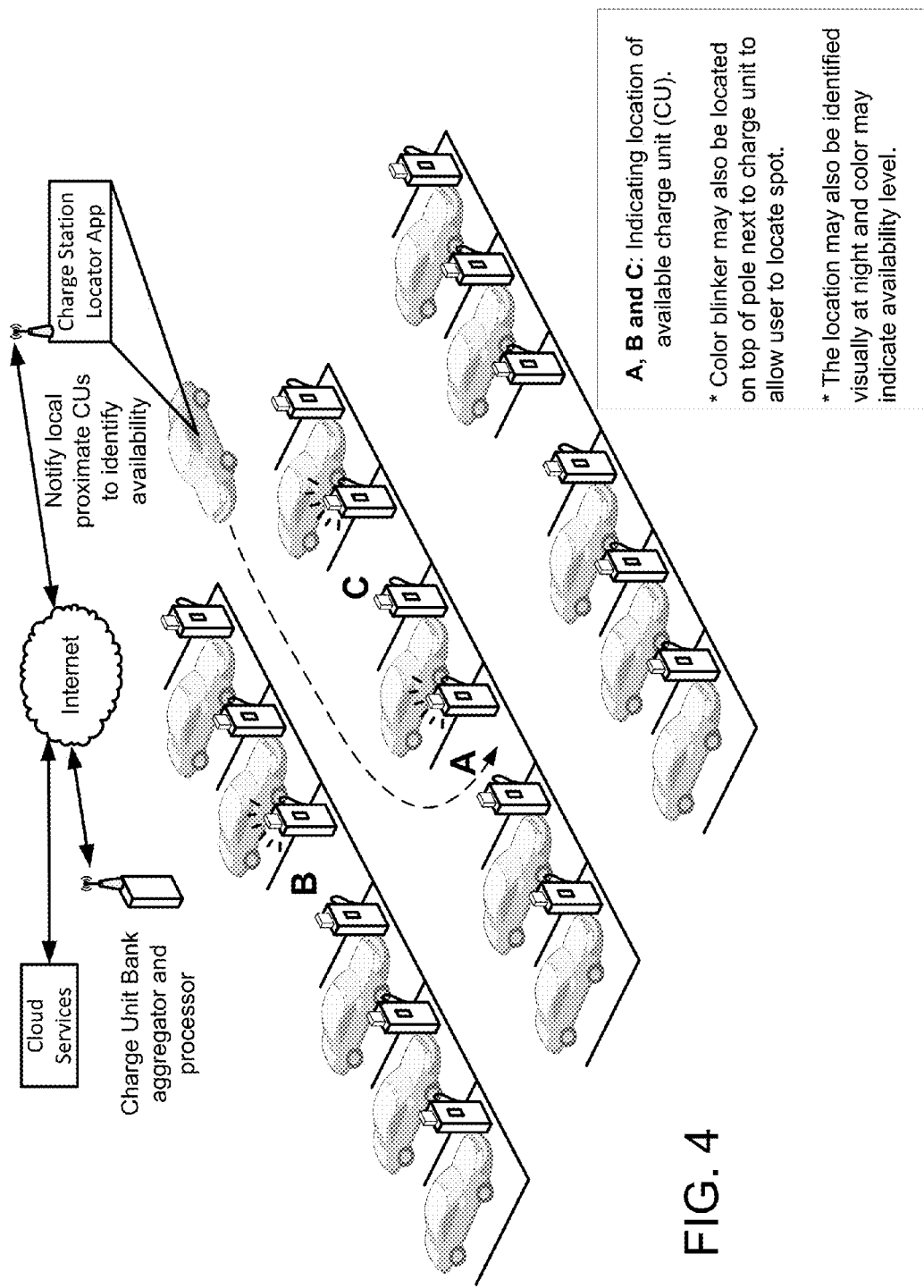
FIG. 4 illustrates an example of color codes used in a parking area, where color is used to identify open spaces with CUs that are available, in accordance with one embodiment.

In one embodiment, a method and system for providing parking slot location identification for securing charge, is provided. The method includes defining a map of a parking lot with one or more charge units (CUs). The CUs, as shown in FIG. 4, can be located throughout a parking lot or area. The CUs, in one embodiment, will include a light indicator. The light indictors can be, for example, on top regions of the CUs or on poles next to the CUs, or simply proximate to the CU. The lights can light up, for example, above the level of the cars that are parked in the lot, or, for example, above 3-8 feet from the ground. A driver of an EV can drive into a parking lot, see the lighting of an available CU (e.g., by color code; green available; red occupied, etc.). The lights can have a blinking function, to signify where CUs are available. The location of available CUs can also be populated as displayable data to the display screen of an EV (or mobile device) when the EV gets in proximity to CUs that maybe be available.

The indication of availability can also be transferred to the user's mobile device, to signify which CUs are available at a particular location. In one embodiment, the CUs and the status of the CUs can communicate such data to cloud processing, over the internet. Drivers of EVs, connected to the internet can also identify where CUs are located in a particular parking area having CUs.

In some embodiments, the color indicators can be provided on CUs, when not in parking lots. For example, if particular CUs are located outside of a business, the color indicators can have various color shades. Some colors may indicated availability, in-use, reserved, out-of-service, almost done charging, etc. The color indicators can also be communicated to users via notifications. The notifications can be to the displays of EVs or portable devices of the user or to third parties.

Figure 5:
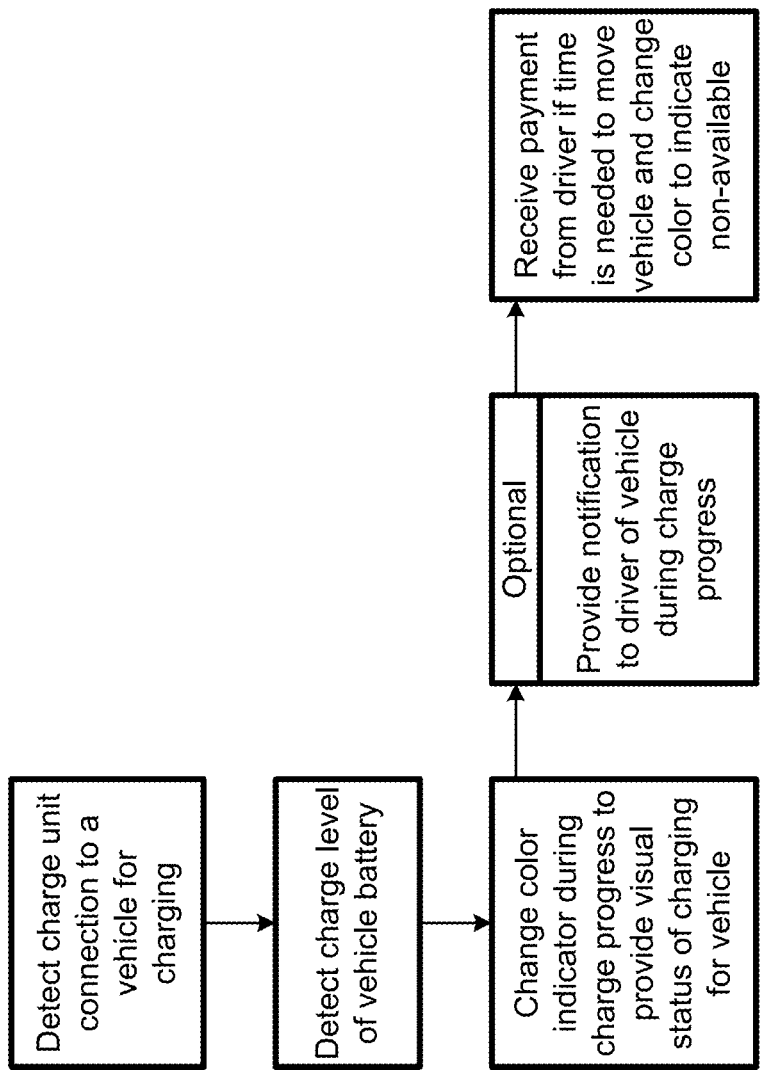
FIG. 5 illustrates an example flow chart of a method, to provide color indicators on CUs, notifications for status, remote pay to extend use of a CU, in accordance with one embodiment.

FIG. 5 illustrates an example flow chart of a method, wherein colors are used to indicate and convey information regarding charge state of an EV, for one embodiment. The method includes detecting that a charge unit is connected to a vehicle for charging. The charge level of the vehicle is then detected. The charge level can be identified, for example, by obtaining data from the vehicle. This data can be obtained by the CU either by a wired connection to the vehicle, such as a data connection line along the charging connector.

The data can also be obtained wirelessly by the CU, such as by allowing the vehicle to wirelessly transfer data to the CU as the charge progresses. This wireless communication can include a pairing process or sync or pairing after a user enters in a code or accepts the conditions or payment options for charge with the CU. The method then includes allowing a color to be activated on the charge unit (CU). As noted above, this process can be allowed, such that the color indicator in the proximity of the CU is lit or activated so that users in the proximate location can see what state the connected EV is, in its charging process. The color can also be transmitted to a user via a notification, such as during the charging process, etc., as noted in this disclosure.

The method also includes changing the color indicator during the charge progress to provide the visual status of charging of the vehicle. The method includes optionally providing notifications to the user or diver of the EV during the progress or after a period of time, or when charging is complete. The method can allow payment to be received from the EV driver if time is needed to allow the user to move the vehicle after the charging is complete. This will, in one embodiment, cause the light indicators to change to an in-progress state. This will also assist in local users to not be frustrated, as they will think the EV is still charging and not done.

As noted above, if the EV is done, and the light indicator shows the EV charging done, a person that wants the spot can walk up to the CU and push a button to request the EV owner to move the car. In one embodiment, if the user pushes the button or does some other input to cause the request, the cloud services can send a notification to the EV owner indicating that people or others wish to use the spot and the EV should be moved.

Figure 6:
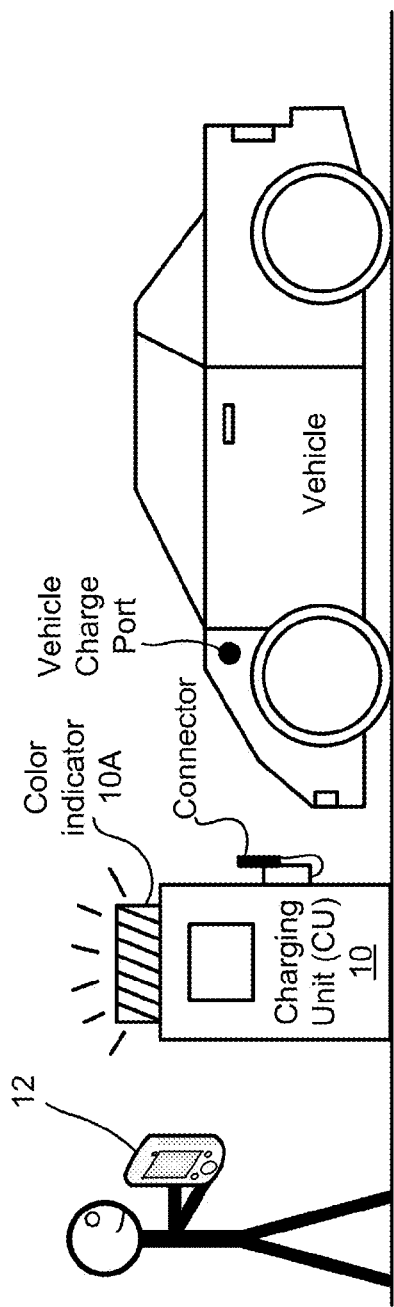
FIG. 6 shows an example of a user with a mobile device approaching a CU, next to an EV, in accordance with one embodiment of the present invention.
Figure 7:
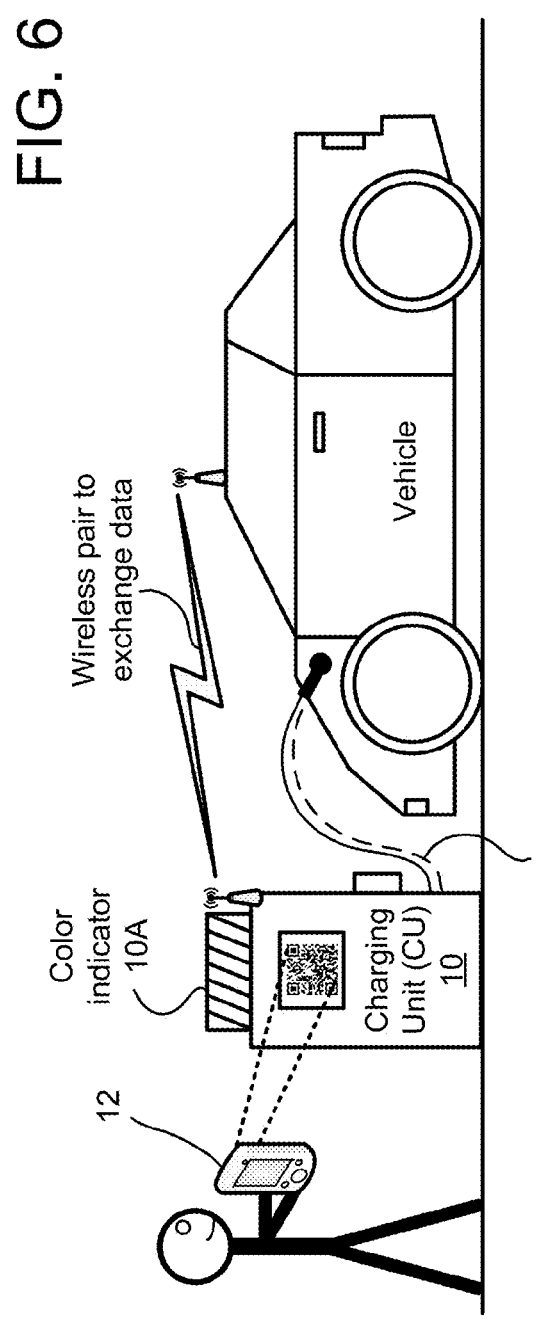
FIG. 7 shows a user accessing a QR code of the CU, in accordance with one embodiment.

FIG. 6 shows an example of a user with a mobile device 12 approaching a CU 10, next to an EV, in accordance with one embodiment of the present invention. The CU 10 may, in one example include a screen or display. In FIG. 7, the user is able to follow directions for obtaining charge from the CU 10. The user, in one embodiment, can scan a QR code, and set the charging instructions, as shown in FIG. 8.

Methods and systems are provided to synchronize user devices with charge units (CUs) to being a charging session. As shown in FIG. 6, the user can arrive to a CU 10 with a device 12. The CU can have a display, which can provide instructions for adding charge to the electric vehicle (EV). FIG. 7 shows a user that has plugged the charging cord to the vehicle, and has scanned a QR code. The cord, in this example, is a charging connector that connects to the CU and also allows connection to the EV at a charge port. If the socket on the charging connector does not mate to the EV charge port, a universal plug or adapter can be used. An adapter can also be used, depending on the type of charging voltage, or process needed to charge particular vehicles, as some EV manufacturers use proprietary plugs or interfaces. Although QR codes are described, other ways to sync the device to a CU to establish a charge session are possible. For example, the CU can provide a phone number, a credit card reader, a password input, a user input interface or touch screen, a bar code, a wireless link via WiFi, internet, or Bluetooth, or other connection interfacing methods and protocols. The CU may also omit having a display, and the EV can simply detect the presence of the CU and ask the user/driver via an on-board screen if the user wishes to obtain charge at the CU that is proximate to the vehicle. The EV screens and apps can also ask the user if they wish to accept a link or pairing with a proximate CU, and then enable screens and GUIs to allow the user to enter codes, sync with payment systems or interfaces and complete the transaction to obtain charge.

Figure 8:
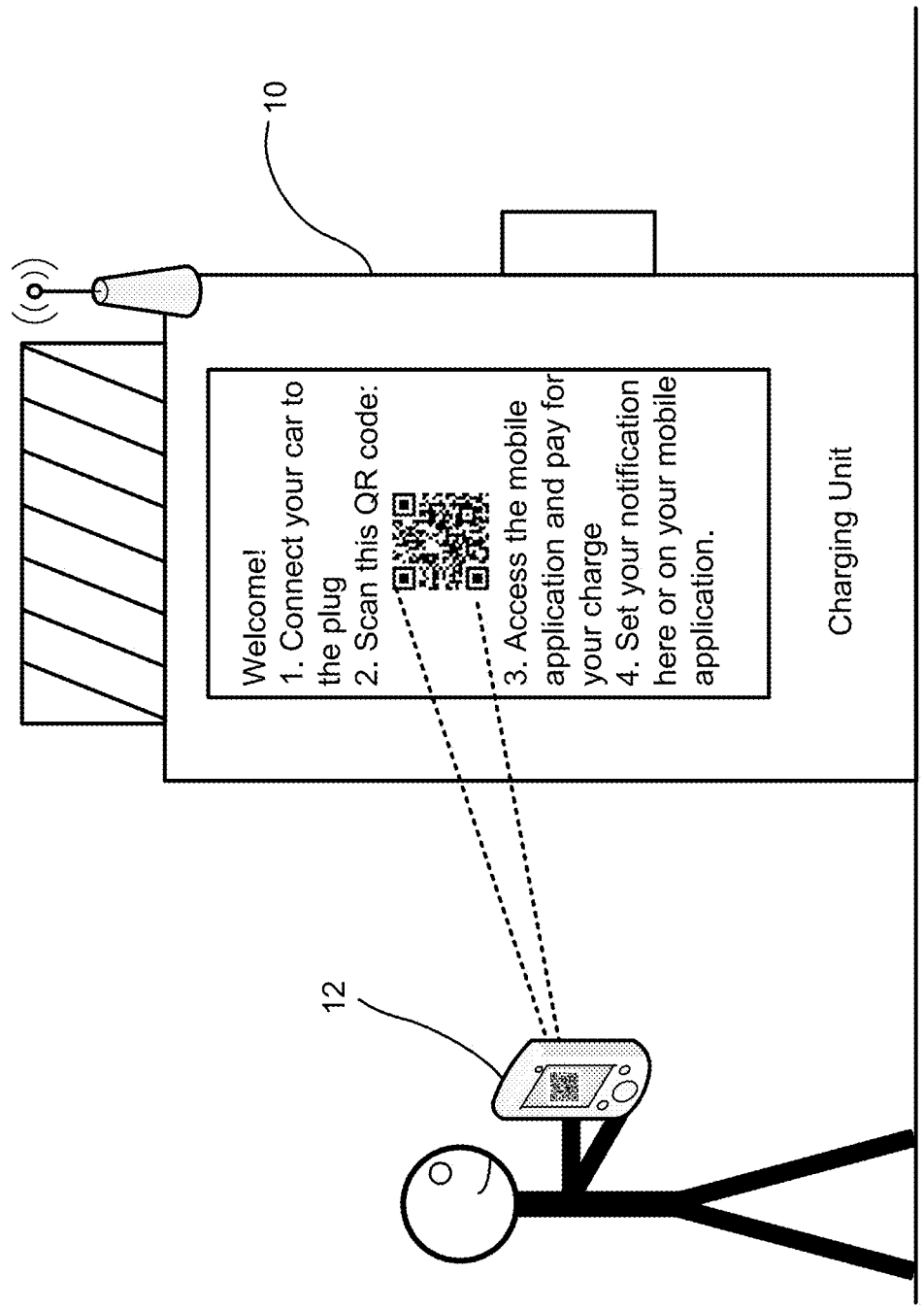
FIG. 8 shows an example screen with instructions, so the user can sync with the device and select the level of charge, in accordance with one embodiment.

FIG. 8 shows an example screen with instructions, so the user can sync with the device and select the level of charge. The sync operation can also be by way of accessing an app over the internet or entering a code of the CU into an app, which is connected to the internet. Notifications for the user, once charge has begun can also be set, either at the CU or on the user's device graphical user interface, or any device connected to the Internet.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as buses, automobiles, trucks, cars, buses, trains, trolleys, etc. Example vehicles can include those that are combustion engine based, electric engine (EV) based, hybrids, or other types of energy source vehicles.

A cloud processing system, as described herein, will include systems that are operated and connected to the Internet or to each other using local networking communication protocols. A cloud processing system can be defined as an interconnected and distributed physical or virtual software defined network that utilizes virtual or physical processing and storage machines that enable various applications and operating systems to facilitate the communication with and between various client devices (vehicles, user devices, structures, objects etc.). The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs can produce operations that can respond to requests made by other processing systems that may be local to a vehicle's electronic system. For example, a vehicle can include electronics that utilize memory and a processor to execute program instructions to provide services.

In other embodiments, the electronics of a vehicle can synchronize with a user's portable electronics. The user's electronics can include, for example mobile devices that include smart phones, tablet computers, laptop computers, general-purpose computers, special purpose computers, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle.

The wireless communication can include cellular tower communication that couples and communicates through various networks to the Internet, to provide access to cloud processing. Other methods can include providing Wi-Fi communication to local Wi-Fi transmitters and receivers, which communicate with cloud processing 120. Other types of communication can include radio frequency communication, such as Bluetooth communication or combinations of Wi-Fi and Bluetooth. It should be understood that vehicle electronics can communicate with cloud processing 120 via any number of communication methods, so long as exchanges of data can be made with cloud processing 120 from time to time.

The communication can be made by vehicle electronics while the vehicle is on or when the vehicle is off, so long as communication and processing circuitry of vehicle electronics has a power source. The power source can include battery power that powers vehicle electronics to communicate with cloud processing 120 when vehicle is turned off. When vehicle is turned on, the battery that drives vehicle electronics can be recharged.

In one embodiment, at a remote location, a user is able to access a user interface for an application, which provides users access to their user accounts. A user account can be for a user and the user can add one or more vehicles, objects, data or appliances for remote reporting, viewing and control. In one embodiment, a user is an owner or user of a vehicle. The user can register the vehicle with a remote service.

The remote service can be accessed over the Internet, such as via a website or application of a portable device. The remote service can provide a multitude of cloud services for the user, such as remote control features, remote viewing services, remote alarm controls, remote camera activation, remote audio/video recording of the vehicle (i.e., areas around the vehicle and inside the vehicle). In one embodiment, the vehicle is able to connect to the Internet (e.g., when the vehicle engine is off, on, and/or is occupied or un-occupied) to allow a user, via a remote cloud service, to access features of the vehicle. The vehicle can be accessed when running, when parked, when stopped, when moving, etc. The vehicle and its audio recording devices and video cameras can be accessed from remote locations, to allow users to remotely communicate with the vehicle or with people riding or residing inside the vehicle.

The remote communication can also allow a person to communicate remotely with people standing outside (or inside) of a vehicle. For instance, if a user is accessing his or her vehicle from a remote location, cameras installed in and/or on the vehicle allow the remote user to see a person standing proximate to the vehicle. The remote user can then communicate with a person standing proximate to the vehicle using microphones and speakers of the vehicle.

In some embodiments described herein, vehicles, structures and objects may include circuitry and communication logic to enable communication with a cloud processing system over the Internet.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user. The input from a user can also be provided by voice input, facial recognition, eye-retina scans, fingerprint scans, a combination of biometrics, or via a capacitive or regular touchscreen contained or displayed within the vehicle, the vehicle's glass, doors, dashboard etc.

In one embodiment, vehicles can maintain information regarding where they are, where they are heading and their destination maintained which is maintained by GPS and navigation systems on board. The information collected and maintained by every vehicle may be mutually exclusive, meaning that only each individual vehicle is aware of its own heading, rate of speed and current location. This information, in one embodiment is crowd sourced and/or crowd shared/consumed for use in for accident avoidance or other communication. By networking vehicles within a certain radius together, all individually location-aware vehicles become aware of all other vehicles in their sphere of influence. Vehicles may network with vehicles in their range using wireless communication systems such as but not limited to Wi-Fi, Wi-Gig LTE, cellular, radio, near field communication or other methods.

In one embodiment, the communications of the vehicle and electronics of the vehicle will enable direct communication with a user of the vehicle. The user of the vehicle can include, for instance, the owner of the vehicle, a driver of the vehicle, or any third party having access to the vehicle (either to drive the vehicle, to monitor the vehicle remotely, etc.)

The access to the data can also be encrypted to prevent unauthorized access to the data. GPS and mapping services can also be in communication with the cloud processing provide data concerning the locations of the vehicles and activities that occurred to the vehicles when at particular locations. The cloud processing can be access by the vehicles themselves using their electronics and communications, via mobile devices, from home, from work, etc.

In some embodiments, the vehicles may establish peer-to-peer links to facilitate fast transfer of data. In other embodiments, vehicles may link to each other using pairing algorithms that allow the vehicles to exchange data using WiFi, Bluetooth, near field communication (NFC), or some other short range communication protocol.

A user's APP homepage may also include dynamically updating sections in which the most important information at a given time may be displayed or surfaced to a user. If a user has parked in a certain parking area, he or she may want to monitor metrics related to incidents that may have occurred to his or her vehicle, vehicles around his or her vehicle, any dynamically received alerts, as well as precaution levels. Additionally, a user may choose to configure his or her APP homepage to display the most pertinent audio and video feeds to their needs.

In one embodiment, the vehicles can communicate directly with each other via a temporary pairing process. The temporary pairing process can be automatically enabled when vehicles become too close to each other, for example. When this happens, local communication between the vehicles, such as a peer-to-peer connection, Wi-Fi connection, NFC connection, or Bluetooth connection can be established to enable the vehicles to share information concerning their proximity to one another. This local communication will enable one or both vehicles to take correction actions or alert a driver to change course or trigger automatic collision prevention measures (e.g., more aggressive notifications to one or both operators, slow the speed of one or more vehicles, change the driving direction of one or more vehicles, etc.). Once the close proximity communication occurs and some corrective action is made, the data regarding the occurrence and the actions taken can be communicated to the cloud system for storage. The information can then be viewed by a registered user having access to an account for the vehicle(s).

Another embodiment is for a method for providing charge options to drivers of electric vehicles. The method includes receiving data concerning charge providing availability from charge locations, receiving a request from processing logic of an electric vehicle, the request identifying a desire to obtain charge, and determining a current location of the electric vehicle. The method further includes determining identification of charge locations in proximity to the electric vehicle and determining any sponsored rewards offered by the charge locations. The method communicates to the electric vehicle a path to one of the charge locations, the path identifying a sponsored reward offered at the charge location for the path.

Yet another embodiment, a computer processed method for providing charge options to drivers of electric vehicles is provided. The electric vehicles have wireless access to a computer network. The method includes receiving data concerning charge providing availability from charge locations and receiving data concerning sponsored rewards offered by the charge locations and rules for offering the sponsored rewards. The method receives a request from processing logic of an electric vehicle, and the request identifies a desire to obtain charge in route between a current location of the vehicle and a destination location. The method includes generating a plurality of paths that can be traversed by the electric vehicle between the current location and the destination location, where each of the paths identify possible charge locations at which the electric vehicle can be charged. Each of the possible charge locations identifying any sponsored rewards offered if the electric vehicle obtains charge at the possible charge locations. The method includes forwarding the plurality of paths as options to the user of the electric vehicle via a user interface. The sponsored rewards are identified to the user to enable tradeoffs between length of path and reward obtained.

Methods and systems for providing charge options to drivers of electric vehicles are provided. One example method includes receiving data concerning charge providing availability from charge locations and receiving a request from processing logic of an electric vehicle, the request identifying a desire to obtain charge. The method includes determining a current location of the electric vehicle and determining identification of charge locations in proximity to the electric vehicle. The method further includes determining any sponsored rewards offered by the charge locations and communicating to the electric vehicle a path to one of the charge locations, where the path is identified with a sponsored reward offered at the charge location if the path is selected and charge is obtained. The method can be processed by a server and paths are communicated to vehicles to alert drivers of the electric vehicles of rewards or discounts if charge is obtained from certain locations. Other embodiments that compliment sponsored paths for obtaining charge are described below, and relate to electric vehicle charging and reduction of range anxiety.

Embodiments are also described for methods and systems for providing auxiliary charging mechanisms that can be integrated or coupled to a vehicle, to supplement the main battery of a vehicle. The auxiliary charging mechanism can be in the form of an auxiliary battery compartment that can receive a plurality of charged batteries. The auxiliary battery compartment can be charged with or without the vehicle, and can be installed or placed in the vehicle to provide supplemental charge to the vehicles main battery. Thus, if the main battery becomes depleted, the auxiliary battery compartment, having a plurality of charged batteries, can resume providing charge to the vehicle.

In other embodiments, the auxiliary battery can be one compartment that has multiple smaller compartments for receiving volt bars (charging units), or other battery type charging devices. Further, the auxiliary battery is interconnected to the main battery of the vehicle, or to a battery distribution or charge distribution-handling unit. In other embodiments, the auxiliary battery can be inserted into side panels of the vehicle, in the front compartment of the vehicle, the floorboard of the vehicle, the site support structure of the vehicle, etc.

Cloud processing technology is also provided, which provides processing resources to connected vehicles through a distributed network. In one embodiment, the cloud processing can communicate with various charging stations using Internet connections, where charge Station metrics can be uploaded to the cloud processing system. The charge Station metrics can include availability of charge pumps, charge handles, charge plugs, charge mats (for wireless charging), volt bars, or other charge providing facilities.

Examples of such metrics can include the number of charge pumps available at particular period of time, historical availability times of the charge pumps, typical charge time estimates at particular charging stations, prices associated with the charge at the particular charging stations, feedback from customers through social networks, concerning the charging stations, and the like. The cloud processing can then process the charge Station status, traffic information associated with locations around or between charging stations and a user's current location, and provide specific suggested routes. The route generator can provide guided routes to the various charging stations (e.g., charge locations), based on the users immediate needs, desire for discounts, sponsored rewards, or the amount of time it will take to obtain access to a charge pump at a particular point in time. Broadly speaking, a discount is a reward and a reward is a discount, and a sponsored reward is a discount that is at least partially paid by another party for the benefit of the recipient of the reward.

Broadly speaking and without limitation, obtaining charge will include plugging the vehicle into a charging receptacle so as to charge the native battery of the vehicle. In another embodiment, obtaining charge can also include refilling on volt bars to replenish volt bars that have been used during the vehicle usage. In other embodiments, charge can be transferred to a vehicle wirelessly (e.g., without plugging in an outlet or receptacle). Examples can include a transfer surface that the vehicle parks over, and the charge can be transferred wirelessly to the vehicle via conductors on the underside of the vehicle. The vehicle can simply park in the slot and once payment is made, the charge can start to flow capacitively or wirelessly to the electric vehicle.

The driver location processor can communicate the information concerning drivers to the cloud processing logic, so as to provide the most effective information concerning charge availability to the various drivers. For example, users in their particular vehicles may have a connected display or a portable device having access to the Internet. Based on the users location and charging needs, (and optionally the destination) the user can be provided with route options (e.g., one or more optional paths). The route options can be, for example, the fastest and most available charge Station (or charge providing devices) to the users current location, the cheapest charge available at a particular point in time, or information regarding charge prices for a particular future point in time.

Once the user selects a route option, the route generator can provide information concerning the charging station, and can also prepay or book a charging station slot. A charging station slot can include, for example a parking spot in front of a charging station. The charging station slot can be reserved if the user decides to prepay for the charging station, as a convenience. For example, if charging slots at a particular charge Station appear to be heavily used, a user can pre-reserve a charging slots ahead of time, so that when the user arrives at the charging station, the charging slot will be immediately available. This could be considered a convenience fee associated with pre-reserving of a charging slot, along a particular route. In another embodiment, the charging station can provide incentives to users to come to the particular charging station.

For example, if the user prepays for charge at a particular charging station, the charging station can provide a discount on the charge provided. For example, if the charging station wishes to fill a plurality a charging slots during a particular slow time, the charging station can communicate with the cloud processing and publish availability of its charging stations per particular period of time. A database associated with cloud processing will hold this information so it can be dynamically updated and accessed in real-time by users to fill their charging needs of their electric vehicles. During that particular period of time, the charging station can offer discounts or rewards to users so that drivers can decide to visit the charging station instead of another charging station. Still further, charging stations can offer discounts for users to use the particular charging station, and the discounts can be offered by more than one party or entity. For instance, if the charging stations are located near a particular business, that particular business can sponsor discounts or rewards at the charging station to drive traffic to or near that particular business. When users are charging their vehicles at the particular station near the particular business, users can spend their time at the particular business while their vehicle is being charged.

Potentially, the owners of the particular business that sponsored the discounts can increase traffic to their business and increase sales. In another embodiment, the owners of the particular business can offer discounts to their business products or services, if the business products or services or located near or beside the charging station. As will be described below, other embodiments can include having charging station pumps or handles or plugs, located in nontraditional charging station configurations. For example, charging plugs can be installed at various nontraditional locations, such as parking lots of retail stores. Other examples locations can include, without limitation, parks, city streets, parking garages, post offices, government areas, schools, offices complexes or campuses, coffee shops, malls, strip malls, box store parking lots, beach parking, homes, public roads, etc. If a large retail store has a large parking lot, a portion of that parking lot can be dedicated for charging plugs, which can be used by customers while the customers shop at the retail location. In such a situation, the owners of the retail store that have charging plugs assigned to particular parking spots, can publish availability of those charging plugs through the cloud processing network.

The cloud-processing network can then publish availability and prices for users that may be driving around, or may be passing by the retail store along a particular path or route. In some embodiments, the retail store can offer significant discounts for charge, if users charge their vehicles at the charging plugs of the retail store. While the users charge their vehicles, the users may visit the retail store and purchase goods or services, which is a reward for the retailer that is offering the discount for the charge. In still another embodiment, retail stores having charge plugs can advertise availability of the charge plugs (and parking spots) in real time, and provide discounts or deals to users that may wish to charge at the particular retail location.

The discounts can be for the goods and services of the retail store, or simple discounts on the charge provided by the charge plugs of the retail store. As noted above, one embodiment would allow the parking spots having the charge plugs to be reserved and advance, to provide additional convenience to users. In such a configuration, the parking spots can include mechanical barriers that lift and close to allow vehicles to come into and leave the particular parking spots. Thus if a parking spot is reserved, the mechanical barrier can remain closed until the vehicle having the code can communicate access to lift the mechanical barrier so that charging can commence immediately upon arriving at the reserved parking spot. In another embodiment, the charging station or plug can include a monitor or display that indicates whether or not the charging plug is reserved.

If the charging plug is reserved, no other user can park in front of the parking spot, or else received a ticket or fine for parking in a parking spot that's been reserved. The parking spot reservation for charge can be made in advance; such as while user is driving around smart phone, or an integrated device of the vehicle that has access to the Internet makes looking for charge and the reservation. The transaction can also allow a user that is searching for charge to prepay for the charge using a graphical user interface or other exchange mechanism, associated with the route and reservation of a particular charge station or slot. In some embodiments, the charge stations or plugs can be placed in shared parking lots or locations where multiple retail outlets reside.

In such a case, multiple retailers can provide discounts to users to come and use the charging stations located at the retailer's locations. These discounts can then be published to the cloud processing logic. These discounts can also be published dynamically at the request of the provider of the charge, using an Internet portal that allows the user to participate in a network of charge stations that provide discounts. In such embodiments, the discounts can be provided by multiple retailers for their goods and services, and the plug can be located in the shared parking lot. Having this information, the cloud processing can communicate with a route generator to generate various routes (e.g., paths) that are optimized to the user's desired outcome.

The optimization can be to route a user for charge along a plurality of charge stations or plugs that provide discounts. If this is the goal of the user, the route may be longer than other routes, but the discounts may be greater. Such routes may be viewed as a sponsored path that requires a user to traverse a particular route in order to obtain charge for their vehicle. The sponsored routes can change dynamically over time, as sponsors decide to add or remove discounts. Thus, a user that finds a good path may wish to buy now, to avoid losing the discount. If a particular charge station or chart plug has a lot of customers during a particular period to time, the discounts may drop dynamically. If the charge plug for station experiences low activity, the discounts may be increased dynamically. The dynamic adjustment of discounts can occur based on a preset number of rules (e.g., what discount, where offered, when offered, how long it lasts, incentives for fast buy, logic for combining discounts, logic for sharing costs of discounts with others, logic for reducing the cost of the charge, etc.), as set by the provider the charge and/or the sponsor.

The cost for the charge can also be provided with a green rating, which signifies how efficient the charge station is in supplying charge, and the location and source of the charge provided by the charging station. If the charging station obtains charge from wind power, the green rating would be high. If the charge station receives its charge from fossil fuels, the green rating may be lower. If the charging station receives is charge from a variety of different sources, whether solar, wind, or fossil fuel, the green rating can be adjusted. This metric information can then be provided to the cloud processing to allow users of electric vehicles to decide whether or not to visit a particular charge station or charge plug.

In some embodiments, the price of the charge may be more expensive if the green rating is very high, but the charge value to the user may be high, if the user wishes to obtain a very high green rating, and a lower carbon footprint.

For example if the user wishes to replace the vehicle, the user can simply click a button, select an icon, touch a screen, speak a command, gesture an input, etc., to figure out what his vehicle value is, the cost of a replacement vehicle, and the total cost after exchange. This information can be useful to the user in deciding whether or not to trade in the vehicle or remain with the current vehicle and make investments in repairs. As shown, the data exchange between vehicles and the vehicles and the cloud processing can be extensive, but such information can be made available to drivers of those vehicles to make informed decisions.

The drivers can also be provided with information of the duration of the discount, so that drivers can obtain the discount if they have the time to traversed the path, or avoid the path if the discount will not be present when the driver arrives at that application. In another embodiment, the logic in the vehicle or the processing system in the cloud processing can determine whether or not the user would be able to arrive at each of the charging stations or plugs to receive the sponsor discounts. This analysis can include, for example, reviewing traffic patterns, travel speeds and estimates to traversed the different distances, time of day, etc.

In some embodiments, the discounts are provided by a combination of the charge station and retail shops nearby. In other embodiments, the retail shops and plugs/charge providers can provide combined packages of discounts, which could drive users to their location. Accordingly, it should be understood that the dynamic generation of paths could be sponsored, such that the user can be provided with identification of charging locations along a particular path, and the discounts that may be provided along those particular paths.

Again, the information displayed to the user can be displayed in the vehicle's display screen or can be displayed on the users display device (e.g. smart phone, computer, tablet, etc.).

Broadly speaking and without limitation, obtaining charge will include plugging the vehicle into a charging receptacle so as to charge the native battery of the vehicle. In another embodiment, obtaining charge can also include refilling on volt bars to replenish volt bars that have been used during the vehicle usage. In other embodiments, charge can be transferred to a vehicle wirelessly (e.g., without plugging in an outlet or receptacle). Examples can include a transfer surface that the vehicle parts over, and the charge can be transferred wirelessly to the vehicle via conductors on the underside of the vehicle. The vehicle can simply part in the slot and once payment is made, the charge can start to flow capacitively or wirelessly to the electric vehicle.

As can be appreciated, the sponsored path process can provide a quick and efficient manner for allowing the user to identify their desired endpoint, and provide options for traversing a path to that and point. Along that endpoint, the user can be provided with discounts for charge by sponsors, which can influence or drive people to their charging outlets. The discounts can also be provided in a hybrid manner, such as providing discounts for the charge and discounts with in the retail outlets that are located proximate to the charging stations.

Providing this information to drivers in real time is efficient for both drivers and the retail locations. Drivers in their electric vehicles will need charge, and providers of the charge will benefit from driving users to their location. If the user is still progressing along their desired path, the providers of the discount are simply providing a service and driving customers to their location, where the drivers may purchase other goods and services while the vehicle is being charged.

In one embodiment, the sponsored paths may be generated on electronics and circuitry of the vehicle, or by processing in the cloud processing system (e.g. networked Internet systems). In some embodiments, the sponsor paths may be processed partially on the vehicle and partially on the cloud processing system. In some embodiments, the sponsored paths would be dynamically generated on the cloud processing system, and the vehicle or smart phone of the user would simply connect to the cloud processing system.

The data exchange can therefore be dynamically set to be real time, such that providers of the discounts, providers of the charge, and drivers of the vehicles can exchange information. In this example, the provided to the charge can provide discount information, incentives, etc., and the drivers of the vehicles can provide information concerning their desired paths. The processing system can then generate a plurality of options for the user to traverse from point A to point B. For example, the user can select to traverse a sponsored path, to a particular address. The display the vehicle can then requested the user identify whether or not a sponsored path is desired.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the description and claims.

What is claimed is:

1. A computer implemented method for managing charge status of a charge unit (CU) that is provided for public use to obtain charge for a battery of an electric vehicle (EV), the CU including a computer for processing at least part of the method, comprising:

detecting, by the computer of the CU, a connection of a charging connector of the CU to a vehicle charge port of the EV, the detecting of the connection includes processing a data exchange between electronics of the EV and the computer of the CU;

receiving, by the computer of the CU, charge status of the EV while the charging connector is connected to the CU, the received charge status of the EV changes as charge is provided from the CU to the battery of the EV;

activating a visual indicator at the CU, by the computer of the CU, the visual indicator being set to indicate the charge status of the EV, the visual indicator at the CU being publically visible at and proximate to the CU while the vehicle charge port of the EV is connected to the CU, and the visual indicator of the CU indicating availability when the CU is not connected to the vehicle charge port of the EV;

changing the visual indicator of the CU, by the computer of the CU, when the charge status of the EV changes;

providing a network connection for the CU, the network connection being usable by the computer of the CU to communicate with at least one server of a cloud services system, the cloud services system managing access to the CU via user accounts, wherein the computer of the CU communicates with the cloud services system during charging of the battery of the EV;

sending a notification by the cloud services system to a user account that was used to obtain charge for the EV at the CU, the notification providing data for a graphical user interface that shows the status of charge of the EV; and receiving instructions from the user account that was used to obtained charge for the EV at the CU, via a device, to make payment of a fee or receive a charge, to change the visual indicator of the CU to indicate a non-full state even when the EV is at a full level of charge while the EV is occupying the CU and is preventing others from access to the CU that is provided for public use;

sending data by the cloud services system to the computer of the CU to make the change to the visual indicator.

2. The computer implemented method of claim 1, wherein detecting connection includes establishing initiation and processing data exchange between the EV and CU, the exchange of data is through a data line integrated with the charging connector or a wireless link between the EV and CU, or a combination thereof.

3. The computer implemented method of claim 1, wherein the visual indicator at the CU is either connected to the CU or is proximate to the CU, and the visual indicator is set by at least one light emitting diode (LED) or provided by a display screen associated with CU.

4. The computer implemented method of claim 1, wherein the status of charge of the EV is published to the user account that is accessible over the Internet using the device having access to the Internet.

5. The computer implemented method of claim 1, wherein the cloud services system is provided with communication to a plurality of CUs at one or more geo-locations;

receiving a request to find a CU, by the cloud services system, from an EV that is geographically local to one or more CUs;

sending instructions, by the cloud services system to an available CU to activate a blinking of a light to enable visual identification of the available CU from an area that is visually proximate to the CU.

6. The computer implemented method of claim 1, wherein the notification is sent two or more times during progress of charge of the battery of the EV.

7. The computer implemented method of claim 1, wherein the notification is saved to the user account for access from an application or a website.

8. The computer implemented method of claim 1, wherein the payment of the fee provides an amount of time before the visual indicator returns to the full level of charge, the amount of time.

9. A computer implemented method for managing charge status of an electric vehicle (EV) at a charge unit (CU), the CU including a computer for processing at least part of the method, comprising:
    detecting, by the computer of the CU, a connection of a charging connector of the charge unit to a vehicle charge port of the EV, the detecting of the connection includes establishing initiation of a data exchange between electronics of the EV and the computer of the CU;
    receiving charge status of the EV while the charging connector is connected to the CU, the received charge status of the EV changes as charge is provided from the CU to a battery of the EV;
    activating a visual indicator at the CU, by the computer of the CU, the visual indicator is indicative of the charge status of the EV, the visual indicator at the CU being publically visible at the CU while the vehicle charge port of the EV is connected to the CU, wherein the CU is provided for public use, and the visual indicator at the CU indicating availability when the CU is not connected to the vehicle charge port of the EV;
    receiving information regarding charging being active;
    changing the visual indicator of the CU, by the computer of the CU, as the charge status of the EV changes when the charging is active; and
    providing a network connection for the CU, the network connection being usable by the computer of the CU to communicate with at least one server of a cloud services system, the cloud services system managing access to the CU via user accounts, wherein the computer of the CU communicates with the cloud services system during charging of the battery of the EV to communicate a level of charge of the battery;
    wherein a particular visual indicator indicates a full level of charge of the battery of the EV, and wherein,
    a notification is generated by the cloud services system and sent to a user account that was used to obtain charge for the EV at the CU, the notification being sent to at least identify the full level of charge of the battery of the EV;
    wherein the user account that was used to obtained charge for the EV at the CU is enabled to pay a fee or receive a charge to change the visual indicator at the CU, in response to input provided via a device that is connected to the cloud services system;
    wherein the change to the visual indicator acts to indicate a non-full state even when the EV is at the full level of charge and the EV is occupying the CU and is preventing others from access to the CU that is provided for public use.

10. The computer implemented method of claim 1, wherein the visual indicator at the CU is either connected to the CU or is proximate to the CU, and the visual indicator is set by at least one light emitting diode (LED) or provided by a display screen associated with CU.

11. A computer implemented method, comprising:
    detecting, by a computer of a charging unit (CU), a connection of a charging connector of the CU to a vehicle charge port of an electric vehicle (EV), the detecting of the connection includes processing a data exchange between electronics of the EV and the computer of the CU;
    receiving, by the computer of the CU, charge status of the EV while the charging connector is connected to the CU, the received charge status of the EV changes as charge is provided from the CU to a battery of the EV;
    sending a notification by server to a user account that was used to obtain charge for the EV at the CU, the notification providing data for a graphical user interface that shows the charge status of the EV; and
    receiving instructions from a device associated with the user account, to make payment of a fee or receive a charge, to change a visual indicator of the CU to indicate a non-full state even when the EV is at a full level of charge while the EV is occupying the CU and is preventing others from access to the CU that is provided for public use; and
    sending data by the server to the computer of the CU to make the change to the visual indicator, wherein the server communicates over the internet with the device.

12. The computer implemented method of claim 1, wherein the visual indicator at the CU is either connected to the CU or is proximate to the CU, and the visual indicator is set by at least one light emitting diode (LED) or provided by a display screen associated with CU.

13. The computer implemented method of claim 11, wherein the notification is sent two or more times during progress of charge of the battery of the EV.

14. The computer implemented method of claim 11, wherein the notification is saved to the user account for access from an application or a website.

15. The computer implemented method of claim 1, wherein the payment of the fee provides an amount of time before the visual indicator returns to the full level of charge, the amount of time.

16. The computer implemented method of claim 1, wherein the payment of the fee functions as a parking fee when the EV is not actively charging.

* * * * *